United States Patent
Neldner

(10) Patent No.: US 8,499,943 B1
(45) Date of Patent: Aug. 6, 2013

(54) DECORATIVE MAGNETIC TOOL HOLDING APPARATUS AND METHOD OF HOLDING SCISSORS

(76) Inventor: Jaqueline P. Neldner, Colorado Springs, CO (US)

( * ) Notice: Subject to any disclaimer, the term of this patent is extended or adjusted under 35 U.S.C. 154(b) by 823 days.

(21) Appl. No.: 12/386,514

(22) Filed: Apr. 20, 2009

(51) Int. Cl.
*A47F 7/00* (2006.01)
*A47G 1/17* (2006.01)
*A47F 5/00* (2006.01)

(52) U.S. Cl.
USPC ............ 211/70.6; 211/DIG. 1; 206/818; 248/206.5; 248/309.4

(58) Field of Classification Search
USPC ............ 211/1, 70.6, 86.01, 103, 106, DIG. 1, 211/87.01; 206/378, 350, 818; 248/683, 248/206.5, 309.4
See application file for complete search history.

(56) References Cited

U.S. PATENT DOCUMENTS

| | | | | |
|---|---|---|---|---|
| 361,248 | A * | 4/1887 | Winton | 335/285 |
| 2,144,184 | A * | 1/1939 | Hale et al. | 335/285 |
| 2,565,625 | A * | 8/1951 | Phelon | 335/285 |
| 2,733,113 | A * | 1/1956 | Humbargar | 312/249.7 |
| 3,174,714 | A * | 3/1965 | Brndsby | 248/309.4 |
| 3,204,776 | A * | 9/1965 | Brown et al. | 211/70.6 |
| 3,229,820 | A * | 1/1966 | Hentzi et al. | 211/70.6 |
| 3,314,634 | A * | 4/1967 | Carter | 248/683 |
| 3,363,775 | A * | 1/1968 | Shaw | 211/70.6 |
| 3,483,494 | A * | 12/1969 | Cromie | 128/852 |
| 3,776,387 | A * | 12/1973 | Brent | 211/70.6 |
| 3,868,016 | A * | 2/1975 | Szpur et al. | 206/350 |
| 4,183,439 | A * | 1/1980 | Bell | 211/70.7 |
| 4,544,067 | A * | 10/1985 | Miller | 211/70.6 |
| 4,682,698 | A * | 7/1987 | Handler et al. | 211/70.6 |
| 4,826,059 | A * | 5/1989 | Bosch et al. | 224/183 |
| 5,020,666 | A * | 6/1991 | Barlean | 206/376 |
| 5,163,566 | A * | 11/1992 | Hempel | 211/65 |
| 5,213,240 | A * | 5/1993 | Dietz et al. | 224/183 |
| 5,301,822 | A * | 4/1994 | Coleman et al. | 211/70.6 |
| 5,620,089 | A * | 4/1997 | Mills | 206/37.8 |
| 5,630,517 | A * | 5/1997 | Maznik | 211/70.6 |
| 5,660,276 | A * | 8/1997 | Winnard | 206/350 |
| 5,669,516 | A * | 9/1997 | Horn | 211/70.6 |
| 5,725,096 | A * | 3/1998 | Winnard | 206/350 |
| 5,760,668 | A * | 6/1998 | Testa et al. | 335/285 |
| 5,895,018 | A * | 4/1999 | Rielo | 248/206.5 |
| 5,988,408 | A * | 11/1999 | Evans et al. | 211/70.6 |
| 6,056,132 | A * | 5/2000 | Becker et al. | 211/164 |

(Continued)

*Primary Examiner* — Joshua J Michener
*Assistant Examiner* — Devin Barnett
(74) *Attorney, Agent, or Firm* — G. F. Gallinger

(57) ABSTRACT

A magnetic tool holding apparatus having: a) a plastic molding having a front tool holding side portion, a similarly dimensioned rear side portion and a peripheral edge extending between the front and rear side portions; b) a magnetic receptor opening, dimensioned to closely receive and tightly hold a magnet, extending from and the rear side portion of the plastic molding, but said opening not extending entirely through the molding to the front side portion; c) wall attachment means on the rear wall side of the molding for attachment to a wall; and, d) a magnet for insertion within the magnet receptor opening. A method of holding scissors on a wall adjacent to where one is standing and working comprising the following steps: a) obtaining an apparatus as described above; b) positioning and turning screws adjacent into a wall adjacent to where one is working; c) mounting the apparatus on the wall so that the heads of the screws are received in keyhole pockets on the apparatus; and, d) touching the scissors against front side portion of the apparatus. The scissors are then magnetically held thereby.

4 Claims, 1 Drawing Sheet

(56) References Cited

U.S. PATENT DOCUMENTS

| | | | | |
|---|---|---|---|---|
| 6,138,394 A * | 10/2000 | Sulenski | ................ | 40/591 |
| 6,145,676 A * | 11/2000 | Gross | ................ | 211/87.01 |
| 6,587,022 B1 * | 7/2003 | Devine | ................ | 335/285 |
| 6,719,155 B1 * | 4/2004 | Chang | ................ | 211/70.6 |
| 6,811,127 B1 * | 11/2004 | Shiao | ................ | 248/206.5 |
| 6,910,578 B2 * | 6/2005 | Stern | ................ | 206/379 |
| 6,923,317 B2 * | 8/2005 | Coleman et al. | ................ | 206/350 |
| 7,051,884 B2 * | 5/2006 | Dick | ................ | 211/70.6 |
| 7,073,672 B2 * | 7/2006 | Sholem | ................ | 211/70.6 |
| 7,172,079 B1 * | 2/2007 | Shiao | ................ | 211/70.6 |
| 7,261,212 B2 * | 8/2007 | Sholem | ................ | 211/70.6 |
| 7,461,750 B2 * | 12/2008 | Armstrong | ................ | 211/39 |
| 7,510,092 B2 * | 3/2009 | Sholem | ................ | 211/70.6 |
| 7,891,616 B2 * | 2/2011 | Pinchuk et al. | ................ | 248/206.5 |
| 7,946,246 B2 * | 5/2011 | Silverman | ................ | 118/500 |
| 8,215,598 B1 * | 7/2012 | Hausberger | ................ | 248/206.5 |
| 2002/0175131 A1 * | 11/2002 | Johnson | ................ | 211/70.7 |
| 2003/0038100 A1 * | 2/2003 | Liu | ................ | 211/88.01 |
| 2004/0238466 A1 * | 12/2004 | Shiao | ................ | 211/70.6 |
| 2004/0256335 A1 * | 12/2004 | Sholem | ................ | 211/70.6 |
| 2005/0016943 A1 * | 1/2005 | Dick | ................ | 211/70.6 |
| 2005/0109717 A1 * | 5/2005 | Armstrong | ................ | 211/39 |
| 2005/0258059 A1 * | 11/2005 | Joyce et al. | ................ | 206/378 |
| 2005/0269278 A1 * | 12/2005 | Gipson | ................ | 211/86.01 |
| 2006/0065558 A1 * | 3/2006 | Chang | ................ | 206/308.1 |
| 2006/0081488 A1 * | 4/2006 | Lax et al. | ................ | 206/308.2 |
| 2006/0226098 A1 * | 10/2006 | Sholem | ................ | 211/70.6 |
| 2007/0023304 A1 * | 2/2007 | Joyce et al. | ................ | 206/350 |
| 2008/0110951 A1 * | 5/2008 | Lauri | ................ | 224/584 |
| 2008/0217505 A1 * | 9/2008 | Cohoon | ................ | 248/683 |
| 2009/0039038 A1 * | 2/2009 | Armstrong | ................ | 211/39 |
| 2009/0044411 A1 * | 2/2009 | Cotant | ................ | 30/233.5 |
| 2009/0218463 A1 * | 9/2009 | Winnard | ................ | 248/309.4 |
| 2011/0308980 A1 * | 12/2011 | Alfaro | ................ | 206/350 |

* cited by examiner

DECORATIVE MAGNETIC TOOL HOLDING APPARATUS AND METHOD OF HOLDING SCISSORS

FIELD OF THE INVENTION

This invention relates to tool holders used to hold tools on a wall. More particularly this invention relates to a decorative magnetic holder designed specifically to hold scissors.

BACKGROUND OF THE INVENTION

The applicant is involved with cosmetics. She determined that there was an unfulfilled need for a decorative wall attachment to conveniently hold scissors. When a cosmetician is working and standing there is a particular for a tool holder which can be conveniently accessed while standing. In addition to being effective and functional the tool holding apparatus must be ascetically attractive.

OBJECTS OF THE INVENTION

It is an object of this invention to disclose a magnetic wall attachment for tools. It is an object of this invention to disclose an attractive decorative wall attachment for tools and scissors. It is yet a further object of this invention to disclose an easy and effective way of holding the decorative attachment on the wall. It is a final object of this invention to disclose a method of attaching scissors to a wall so that they conveniently accessed while standing.

One aspect of this invention provides for a magnetic tool holding apparatus having: a) a plastic molding having a front tool holding side portion, a similarly dimensioned rear side portion and a peripheral edge extending between the front and rear side portions; b) a magnetic receptor opening, dimensioned to closely receive and tightly hold a magnet, extending from and the rear side portion of the plastic molding, but said opening not extending entirely through the molding to the front side portion; c) wall attachment means on the rear wall side of the molding for attachment to a wall; and, d) a magnet for insertion within the magnet receptor opening.

In a preferred aspect of this invention a method of holding scissors on a wall adjacent to where one is standing and working comprising the following steps: a) obtaining a wall attachment apparatus as described above; b) positioning and turning screws to a wall adjacent to where one is working; c) mounting the wall holding apparatus on the wall receiving the heads of the screws in the keyhole openings; and, d) touching the scissors against front side portion of the holding apparatus. The scissors are then magnetically held by the wall holding apparatus.

Various other objects, advantages and features of this invention will become apparent to those skilled in the art from the following description in conjunction with the accompanying drawings.

FIGURES OF THE INVENTION

Figure 1:
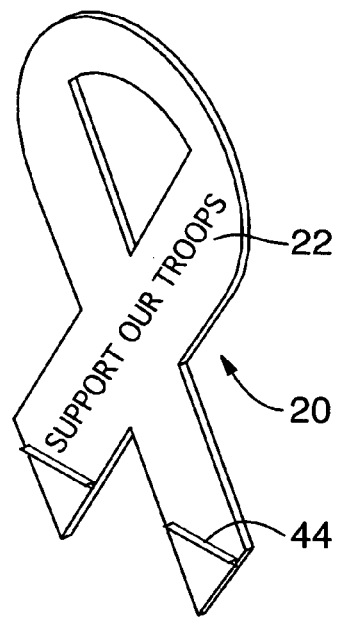
FIG. 1 is a perspective view of the decorative magnetic tool holding apparatus showing the front side portion thereof.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Figure 2:
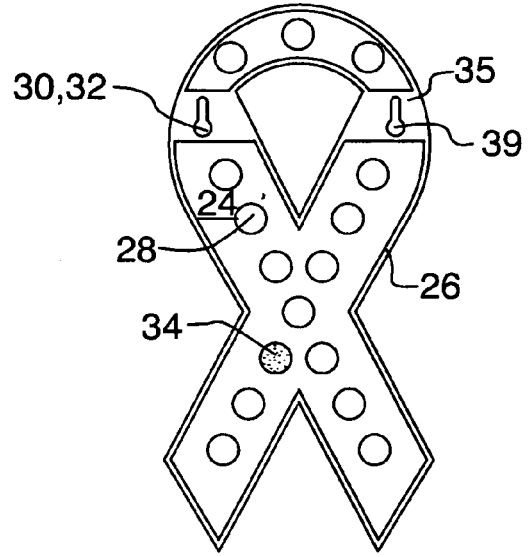
FIG. 2 is a rear plan view of the wall attachment apparatus shown in FIG. 1.
Figure 3:
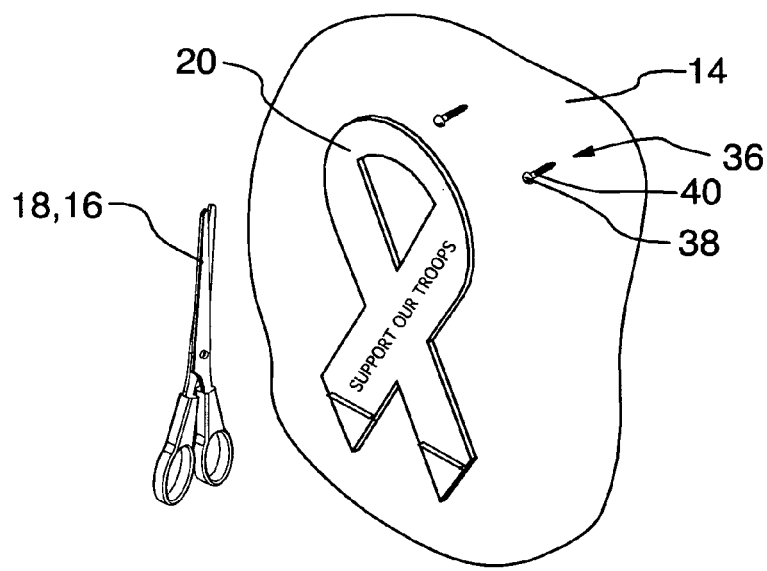
FIG. 3 is a schematic drawing showing the method of use.

Turning now to the drawings and more particularly to FIG. 1 we have a perspective view of a decorative magnetic tool holding apparatus 20. FIG. 2 is a rear plan view of the decorative magnetic tool holding apparatus 20 shown in FIG. 1. A magnetic tool holding apparatus 20 comprises: a) a plastic molding 21 having a front tool holding side portion 22, a similarly dimensioned rear side portion 24 having a peripheral edge 26 extending between the front side portion 22 and rear side portion 24; b) a magnetic receptor opening 28, dimensioned to closely receive and tightly hold a magnet 34. The opening 28 extends from and the rear side portion of the plastic molding 28, but said opening 28 does not extend entirely through the molding to the front side portion 22; c) wall attachment means 30 on the rear wall side of the molding 24 for attachment to a wall 14; and, d) a magnet 34 for insertion within the magnet receptor opening 28.

Most preferably the wall attachment means 30 comprises a rear planar surface 35 having a keyhole opening 32 therethrough and covering a screw head pocket 30 so that the magnetic tool holding apparatus 20 may be attached to the wall 14 with double sided adhesive tape (not shown) using the planar surface 35, or with a screw 36 having its shank 40 positioned through the keyhole 32 and its head 38 positioned within the keyhole pocket 39. Most preferably there are a plurality of magnetic receptor openings 28. Each opening 28 is dimensioned to closely receive and hold a magnet 34.

In a preferred embodiment of the invention the apparatus further comprises a ledge 44 projecting forwardly from the front side portion 22 of the magnetic wall holding apparatus 20 to ensure that a held tool 18 is unable to slide downwardly if it is relatively heavy for the magnets 34 to hold. While this ledge 44 is generally unnecessary, after extended periods of time, if the magnets weaken, or if the tool 18 is unusually heavy the ledge 44 may be useful.

Most preferably the front side portion 22 of the magnetic tool holding apparatus 20 is a decorative shape. In a preferred embodiment of the invention that the decorative shape is the outline of a large ribbon. Most preferably that the plastic molding 21 is brightly colored. In the most preferred embodiment of the invention the front side portion 22 of the molding 21 is painted with a message 23.

A method of holding scissors 16 on a wall 14 adjacent to where one is standing and working comprises the following steps: a) obtaining a wall attachment apparatus 20 as described above; b) positioning and turning screws 36 into a wall 14 adjacent to where one is working; c) mounting the magnetic tool holding apparatus 20 on the wall 14 so that the heads 38 of the screws 36 are received in the keyhole pockets 39; and, d) touching the scissors 16 against front side portion 22 of the holding apparatus 20. The scissors 16 are then magnetically held by the magnetic tool holding apparatus. This method can be narrowed by using an apparatus with the further limitations specified above.

While the invention has been described with preferred specific embodiments thereof, it will be understood that this description is intended to illustrate and not to limit the scope of the invention, which is defined by the following claims.

I claim:

1. A method of holding scissors on a wall adjacent to where one is standing and working comprising the following steps:
   a) utilizing a magnetic tool holding apparatus; said magnetic tool holding apparatus comprising:
      aa) a plastic molding having a front tool holding side portion, a similarly dimensioned rear side portion and a peripheral edge extending between the front and rear side portions;
      bb) a magnetic receptor opening, dimensioned to closely receive and tightly hold a magnet, extending from and the rear side portion of the plastic molding, but said opening not extending entirely through the molding to the front side portion;
      cc) wall attachment means on the rear wall side of the molding for attachment to a wall; and,
      dd) a magnet for insertion within the magnet receptor opening;
   wherein the front side of the magnetic tool holding apparatus is a decorative shape different than the shape of any tool intended to be held;
   b) positioning and turning screws into a wall adjacent to where one is working;
   c) mounting the magnetic tool holding apparatus on the wall so that the heads of the screws are received in keyhole pockets; and,
   d) touching the scissors against front side portion of the magnetic tool holding apparatus; so that the scissors are then magnetically held by the magnetic tool holding apparatus.

2. A method as in claim 1 further comprising the step of configuring the wall bracket in the outline of a large ribbon.

3. A method as in claim 1 wherein the plastic molding is brightly colored.

4. A method as in claim 1 wherein the front side portion of the molding is painted with a message.

\* \* \* \* \*